United States Patent [19]

Barkow

[11] 4,143,345
[45] Mar. 6, 1979

[54] DEFLECTION YOKE WITH PERMANENT MAGNET RASTER CORRECTION

[75] Inventor: William H. Barkow, Pennsauken, N.J.

[73] Assignee: RCA Corporation, New York, N.Y.

[21] Appl. No.: 913,239

[22] Filed: Jun. 6, 1978

[51] Int. Cl.² ............................................. H01F 1/00
[52] U.S. Cl. ..................................... 335/212; 335/210
[58] Field of Search ........................ 335/210, 212, 213

[56] References Cited

U.S. PATENT DOCUMENTS

| 2,730,642 | 1/1956 | Grosejean | 335/212 X |
| 3,899,710 | 8/1975 | Machida et al. | 335/212 X |
| 4,034,324 | 7/1977 | Sano et al. | 335/212 |

*Primary Examiner*—George Harris

*Attorney, Agent, or Firm*—Eugene M. Whitacre; Paul J. Rasmussen

[57] ABSTRACT

A deflection yoke of the self-converging type utilizing pincushion-shaped horizontal and barrel-shaped vertical deflection fields for converging three in-line electron beams includes magnets disposed near the top and bottom beam exit end of the yoke and respectively poled to produce flux of the same polarity as the vertical deflection field at the top and bottom portions of the raster. A second pair of magnets disposed inside the flared inner surface of the yoke at the top and bottom approximately at the center of the yoke length are respectively poled for producing flux which is of the opposite polarity of the vertical deflection field at the top and bottom portions of the raster, the two pairs of magnets cooperating with the deflection field for correcting North-South pincushion distortion with substantially no effect on the beam convergence.

8 Claims, 7 Drawing Figures

DEFLECTION YOKE WITH PERMANENT MAGNET RASTER CORRECTION

BACKGROUND OF THE INVENTION

This invention relates to raster distortion correction arrangements utilized with deflection yokes of the self-converging type.

U.S. Pat. No. 3,721,930 discloses a deflection yoke suitable for use with a three in-line beam color television picture tube for producing substantial convergence of the three beams at all points on the raster without the use of dynamic convergence apparatus. This is accomplished essentially by selecting the winding distribution of the coils for producing respective generally pincushion and barrel-shaped horizontal and vertical deflection fields which are so proportioned as to balance the convergence condition on the axis and in the corners of the raster. This teaching has been utilized in television receivers utilizing beam deflection angles of 90 and 110 degrees.

Pincushion distortion is associated with most television displays including the self-converging type described above. This distortion, generally, is caused by the picture tube geometry and the shape of the magnetic deflection fields. The geometrical distortion occurs because all points of the viewing screen are not equidistant from the deflection center of the yoke. This geometric pattern distortion of the raster increases with increasing beam deflection angle. The magnetic deflection fields influence pincushion distortion in the following manner: if the shape of the deflection field is pincushion the raster distortion is reduced; if the field is barrel-shaped the raster distortion is increased.

It is known that pincushion distortion can be substantially eliminated by using pincushion shaped deflection fields, it is also known that the shape of the deflection field near the front or beam exit is the most sensitive part of the field to control pincushion pattern distortion. This is because the beams are closer together at the front of the yoke than at the rear and the beams also are the most deflected at the front of the yoke. This follows from the third order beam theory that raster distortion is a product of the square of the amount of beam deflection from the central longitudinal axis of the yoke and the amount of transverse nonuniformity of the deflection field. This nonuniformity is generally expressed as the $H_2$ function and is the third order right angle component of the deflection field.

Also, it is known that the deflection field astigmatism, which influences the beam convergence, is best controlled by altering the deflection field further back from the beam exit end of the yoke. Since astigmatism is a linear product of the amount of beam deflection and the $H_2$ field it can actually be compensated for by altering the deflection field anywhere along the yoke central axis, but since the front portion of the yoke is designed for pattern correction the astigmatism correction must be accomplished elsewhere. Saddle-type vertical deflection coils lend themselves to being pincushion corrected because the coil winding cavity on the winding machine can be controlled relatively easily. However, many deflection yokes in use today utilize a toroidally wound vertical deflection winding. Toroidal coils are generally wound having radial conductor turns. Radial turns are those which lie in a plane containing the central longitudinal axis of the deflection yoke. To wind a nonradial toroidal deflection winding with presently available toroidal coil winding machines would require either a significant reduction in the winding speed or increased complexity of the machinery involved, or both.

Obviously, another problem encountered when attempting to wind either a saddle or toroidal pincushion corrected winding is the maintaining of the proper astigmatic field required for self-convergence of the beams.

SUMMARY OF THE INVENTION

A deflection yoke for use with a cathode ray tube includes horizontal and vertical deflection windings. Magnetic field producing means are disposed for producing respective fields near the top and bottom of the yoke and near the beam exit end of the yoke of the same polarity as the vertical deflection field. Flux altering means are disposed adjacent to the flared inner surface of the yoke at the top and bottom at a central portion of the length of the yoke for adding barrel shape component to the vertical deflection field near the vertical deflection axis. The magnetic field producing means and the flux altering means alter the vertical deflection field in a manner to correct raster distortion.

DESCRIPTION OF THE INVENTION

Figure 1:
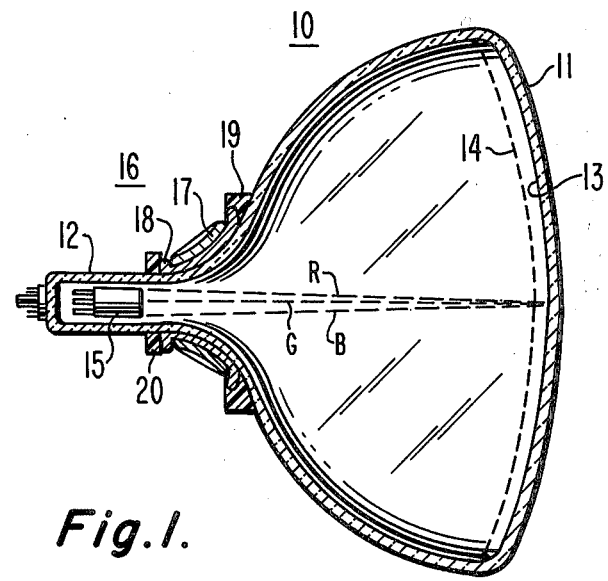
FIG. 1 is a partial top sectional view of a display system embodying the present invention.

In FIG. 1, a color television picture tube 10 includes a faceplate 11 having deposited thereon on the inside repeating groups of red, green and blue vertically disposed phosphor strips 13. An apertured mask 14 is located inside the tube spaced back from faceplate 11. In the neck portion 12 of the tube is an electron gun assembly 15 for producing three horizontal in-line electron beams R, G and B. A deflection yoke assembly 16 is mounted around the neck portion of the tube by a suitable yoke mount 19. The yoke includes a flared ferrite core 17 and vertical and horizontal deflection coils 18. A static convergence and purity magnet assembly 20 is mounted around the neck portion 12 of the tube. Deflection yoke 16 may be of the self-converging type described in the aforementioned United States patent and provides convergence of the three beams at all points on the viewing screen 11 without the use of any dynamic convergence apparatus.

Figure 2:
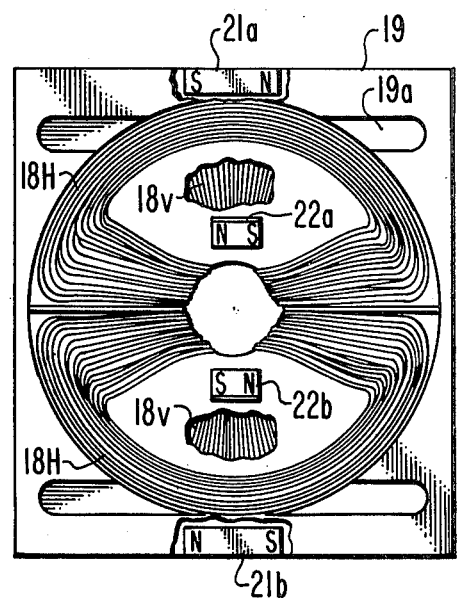
FIGS. 2 and 3 illustrate a deflection yoke embodying the present invention.
Figure 3:
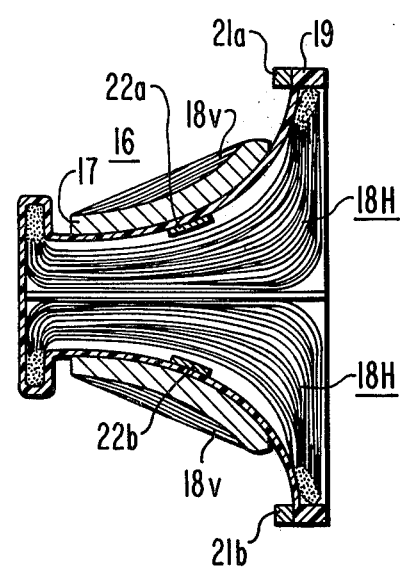
Figure 4:
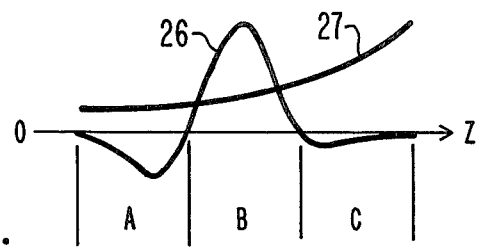
FIG. 4 illustrates flux gradient and beam trajectory curves useful in explaining the invention.

FIGS. 2 and 3 illustrate in greater detail a deflection yoke 16 embodying the present invention. A plastic yoke mount 19 serves to hold a pair of saddle-type horizontal deflection coils 18H in proper orientation in relation to a flared ferrite core 17 around which is toroidally wound a vertical deflection winding 18V. Thus, in this example, deflection yoke 16 is a saddle-toroid type commonly referred to as an ST yoke. In the front view of the deflection yoke 16 looking from the viewing screen of the picture tube as illustrated in FIG. 2 and in the side view of the yoke as illustrated in FIG. 3 a magnetic field producing means illustrated as a pair of magnets 21a and 21b are mounted near the top and bottom of the yoke at the front or beam exit portion of the yoke and are poled as indicated. These magnets are fastened with suitable adhesive in a recess in mount 19.

A flux altering means illustrated as a pair of magnets 22a and 22b are disposed adjacent to the flared inner surface of the yoke at the top and bottom at a central portion of the length of the yoke and are poled as indicated. These magnets are mounted by adhesive on an insulating layer of mount 19 which separates the vertical and horizontal deflection windings. All of the magnets may be permanent magnets and are preferably made of a low permeable material such as barium ferrite so as to provide minimum undesired disruption of the magnetic deflection fields produced by the deflection coils. The flux altering means 22a and 22b may also comprise nonmagnetized pieces of magnetically permeable material such as silicon steel. The purpose of the magnetic field producing means 21a and 21b and the flux altering means 22a and 22b can best be described in conjunction with FIGS. 4-7.

Figure 5:
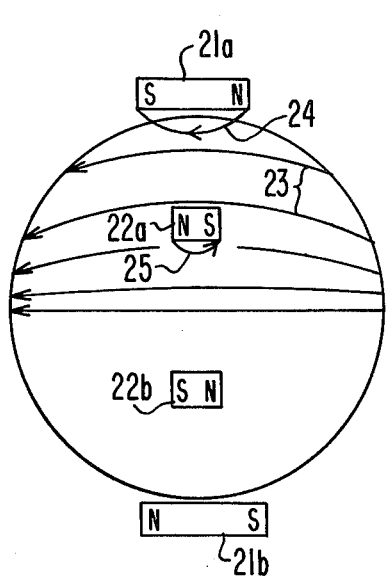
FIGS. 5, 6 and 7 illustrate magnetic fields, magnetic forces and raster shapes, respectively, associated with the present invention.

FIG. 5 illustrates a portion of the magnetic field lines of a barrel-shaped vertical deflection field as viewed from the beam exit end of the deflection yoke. The vertical deflection field lines 23 are illustrated in deflecting the beams in an upward direction from the center of the screen and an explanation of the invention will be given in this context. Although not shown, it is to be understood that the principles of the invention for the opposite polarity vertical deflection field which would deflect the beams towards the bottom of the screen from the center is similar. The only difference is the polarity of the deflection field would be different and the polarity of the magnetic fields of the magnets 21b and 22b would be opposite as indicated by the magnet poles in FIG. 5.

To correct pincushion raster distortion at the top of the raster magnet 21a produces field lines 24 poled as indicated. Field lines 24 are of the same polarity as the vertical deflection field lines 23.

As mentioned above, and, referring to FIG. 4, the magnet 21a is disposed near the beam exit end of the yoke because that is the most effective place at which to correct pincushion distortion. The front portion of the yoke is represented by the portion C of FIG. 4. It can be seen in this portion C, the curve 27 representing the amount of beam deflection is the greatest. Since raster distortion is a function of the deflection distance squared, this portion C of the yoke is chosen as the location to place the magnets 21a and 21b. The curve 26 is the $H_2$ curve of the vertical deflection field. The zero axis is placed where it is to more clearly illustrate the three regions A, B and C of the curve. It should be noted that for a vertical barrel-shaped deflection field that the $H_2$ curve may be entirely below the zero axis.

Figure 6A:
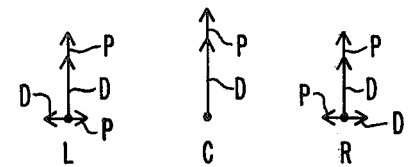

Referring to FIG. 6a, the summation of magnetic force vectors are shown for the left, center and right sides of the raster on the viewing screen. The vectors D represent the force components of the barrel-shaped vertical deflection fields. The vectors P represent magnetic force of the field produced by the magnet 21a. At the center of the screen, the force lines 23 and 24 are tangent and hence the two vectors P and D simply add. At the left and right portions of the screen, the field lines 23 and 24 are not tangent but are curved away from each other and hence are illustrated as a vertical force and right angle forces in the direction shown. It can be seen that the deflection force is greatest at the center of the raster and less at the left and right sides.

Therefore, the beams will be deflected a greater distance vertically at the center than at the sides. This deflection force clearly counters the top pincushion shape of the raster. In this manner, the top raster pincushion distortion is substantially eliminated.

Figure 6B:
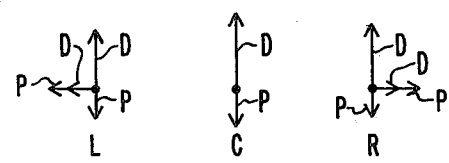

The operation of magnet 21a in conjunction with the barrel-shaped vertical deflection field decreases the effect of the barrel field, and hence pincushion distortion, but also reduces the self-converging effect of the deflection field on the three in-line electron beams. The operation of magnet 22a restores the self-converging effect. The magnetic field lines 25 produced by magnet 22a are of the opposite polarity of the vertical deflection field lines 23. FIG. 6b illustrates the magnetic forces acting on the beams, which forces are produced by the vertical deflection force D are and the force P produced by magnet 22a. At the center of the raster, the forces are tangent and in opposite directions. Hence, the force P directly reduces the force D. At the left side of the raster, the forces are not tangent and hence are broken into right angle components as illustrated. At the right side of the raster, similar to the left, non-tangent field lines also result in the right angle force components. The effect of these forces is to enhance the barrel-shaped vertical deflection field and hence restore the self-converging effect on the beams as they are deflected vertically.

The magnets 22a and 22b are physically located at a central portion along the yoke axis as indicated in FIG. 3. This region corresponds to the central region B of FIG. 4. Although the addition of a barrel-shape component to the vertical deflection field by the magnets 22a and 22b also acts to increase the top and bottom pincushion distortion it is noted that magnet 22a acts in the region B of FIG. 4 in which the deflection of the beams is less than in region C. Hence, insofar as pincushion distortion correction is concerned the effect of magnet 21a predominates. Thus, by placing and poling the magnets as illustrated in the figures, pincushion distortion correction is achieved with substantially no effect on the convergence of the beams.

As mentioned earlier, the magnets 22a and 22b can be replaced by tabs of permeable material. Permeable material will alter the line of flux in the same manner that the opposite polarity lines of force 25 of magnet 22a does and the same self-converging enhancement of the beams can be achieved.

Figure 7:
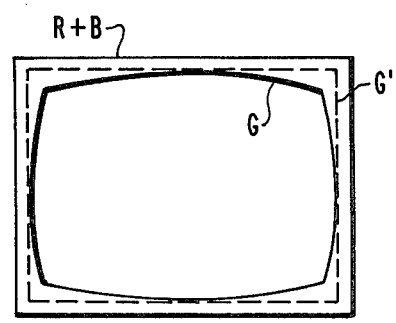

Another situation sometimes encountered with the combination of a self-converging deflection yoke utilized with a picture tube electron gun assembly which includes magnetic field shunts and enhancers is illustrated in FIG. 7 by the raster condition 30. As illustrated, the red and blue rasters indicated by the solid rectangular lines are superimposed indicating a converged condition. The green raster indicated by the solid curve lines G is distorted. The green raster is produced by the center one of the three in-line beams while the red and blue rasters are produced by the outside electron beams. The raster G, in addition to being distorted, is also not the same size as the red and blue rasters, thereby creating a coma condition. The effect of the magnets 22a and 22b on the green raster is as illustrated by the raster G' indicated by the dotted rectangle in FIG. 7. The green center raster distortion is created by the magnets due to the differential action of the magnetic field on the spaced-apart electron beams in the central portion of the length of the deflection yoke. Vertical deflection field, modified by the fields produced by magnets 22a and 22b, or the field altering effect of permeable tabs substituted for these magnets, effects substantially only the raster produced by the central electron beam to correct raster G' in FIG. 7 as illustrated as being smaller than the red and blue rasters for convenience in the drawing. It is to be understood that, corrected green raster is also of the same size as the red and blue raster.

What is claimed is:

1. A deflection yoke assembly for use with a cathode ray tube, comprising:

a pair of horizontal and a pair of vertical deflection coils;

first magnetic field producing means disposed for producing respective fields near the top and bottom of the yoke near the beam exit end of the yoke which are of the same polarity as the field produced by said vertical deflection coils; and second flux altering means disposed adjacent the inside flare of said yoke at the top and bottom at a central portion of the length of said yoke for adding a barrel shape component to said vertical deflection magnetic field near the vertical deflection axis; said first and second means altering said vertical deflection field for producing raster distortion correction.

2. A deflection yoke assembly for use with a cathode ray tube having three in-line beams, comprising:

a pair of horizontal and a pair of vertical deflection coils respectively producing when energized generally pincushion and barrel-shaped deflection fields for producing substantial convergence of said three beams at all points of a raster scanned by said beams;

first magnetic field producing means disposed for producing respective fields near the top and bottom of the yoke near the beam exit end of the yoke which are of the same polarity as the field produced by said vertical deflection coils; and second flux altering means disposed adjacent the inside flare of said yoke at the top and bottom at a central portion of the length of said yoke for increasing the barrel shape of said vertical deflection magnetic field near the vertical deflection axis; said first and second means altering said vertical deflection field for producing raster distortion correction while maintaining said substantial convergence of said beams.

3. A deflection yoke according to claim 2 wherein said first magnetic field producing means includes first and second permanent magnets for producing said same polarity fields.

4. A deflection yoke according to claim 3 wherein said same polarity fields are pincushion shaped relative to said vertical barrel-shaped deflection field.

5. A deflection yoke according to claim 4 wherein said second flux altering means includes first and second magnetically permeable material pieces disposed respectively at said top and bottom inside flare portions of said yoke.

6. A deflection yoke according to claim 4 wherein said second flux altering means includes third and fourth permanent magnets disposed respectively at said top and bottom inside flare portions of said yoke.

7. A deflection yoke according to claim 6 wherein said third and fourth magnets are poled for producing fields which are of opposite polarity to said vertical deflection field.

8. A deflection yoke according to claim 7 wherein said fields of said third and fourth magnets are barrel-shaped in the same sense as said barrel-shaped vertical deflection field.

* * * * *